Patented Jan. 1, 1924.

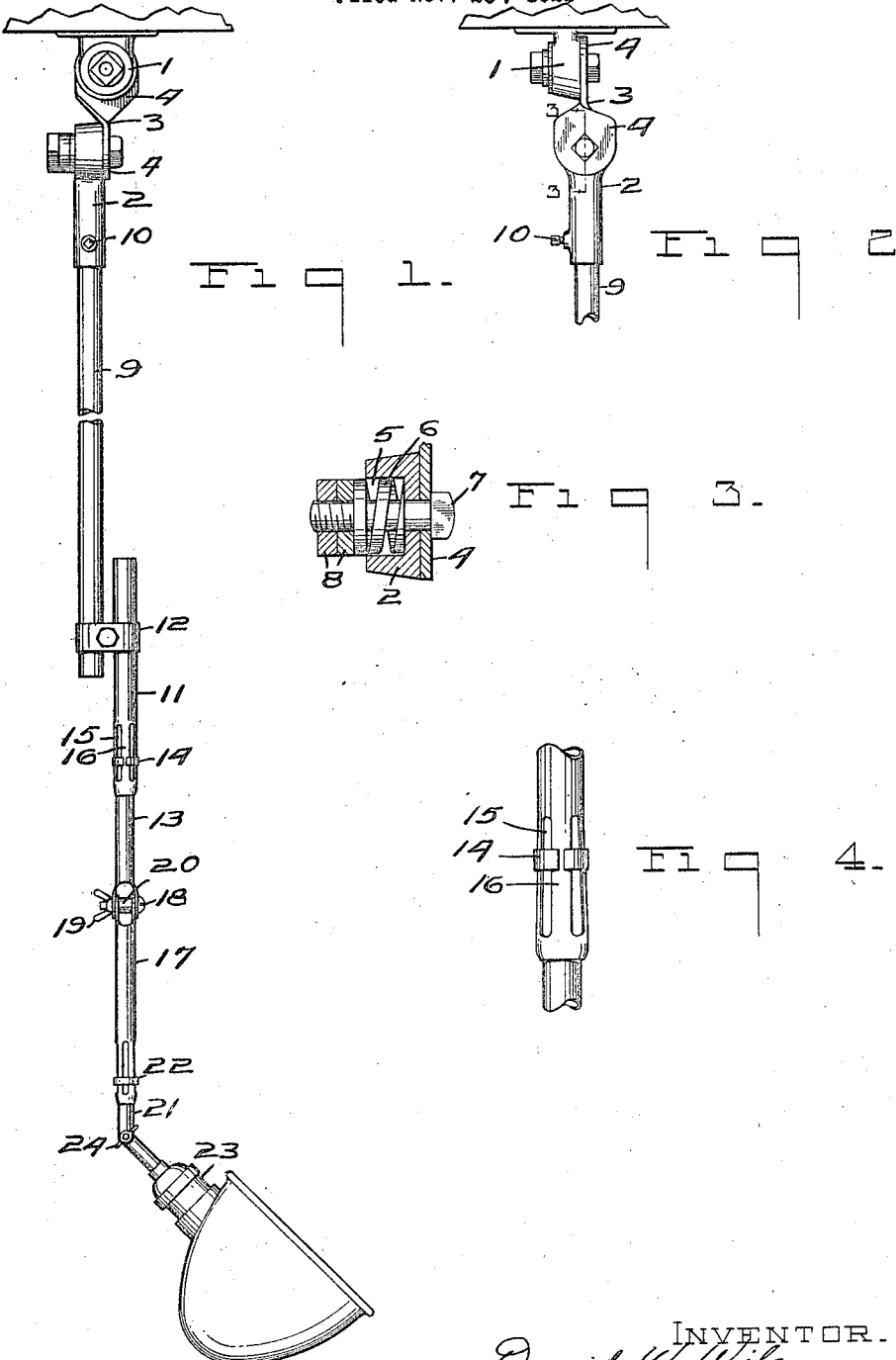

1,479,019

UNITED STATES PATENT OFFICE.

DAVID W. WILSON, OF TOLEDO, OHIO.

LAMP BRACKET.

Application filed November 28, 1921. Serial No. 518,279.

*To all whom it may concern:*

Be it known that I, DAVID W. WILSON, a citizen of the United States, and a resident of Toledo, in the county of Lucas and State of Ohio, have made an invention appertaining to a Lamp Bracket; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a new and efficient lamp bracket that may be readily adjusted and secured in its adjusted position.

Structures containing my invention may be varied in their details. To illustrate a practical application of the invention I have selected a structure containing the invention and shall describe it hereinafter. The structure selected is illustrated in the accompanying drawings.

Figure 1 illustrates a side view of a suspended lamp bracket. Fig. 2 illustrates a broken view showing a side other than the one shown in Fig. 1. Fig. 3 is a sectional view taken on the line 3—3. Fig. 4 illustrates the manner in which telescoping parts of the brackets may be secured in position.

A supporting member 1 is secured to the wall or ceiling of a room and a member 2 is connected to the member 1 by means of a member 3 which is provided with ears 4 that are located in planes at right angles to each other. Each of the members 1 and 2 are provided with recesses 5 in which are located springs 6, and the members are connected to the member 3 by means of bolts 7 and the nuts 8 and are caused to frictionally engage with the member 3 by the elasticity of the springs 6 which draw the ears 4 against the surfaces of the members 1 and 2. A rod or pipe 9 is connected to the member 2 by any suitable means, such as by the key bolt 10. A sleeve 11 is connected to the rod 9 by means of a clamp 12 of any suitable type. A bar or pipe 13 telescopes into the sleeve 11 and is held in position by means of the split ring 14. The end of the sleeve 11 is provided with a plurality of parallel slots 15 that extend along the sleeve 11, leaving flexible portions 16 located intermediate the slots 15. The split ring 14 being elastic, it readily causes the portions 16 to become pressed against the rod or pipe 13 when the ring 14 is pushed towards the center of the length of the slots 15 and portions 16. When, however, the ring 14 is pushed to the ends of the slots the rigidity of the sleeve 11 causes the split ring to distend and thus the pressure produced on the rod or pipe 13 is released. This affords a ready means for clamping the rod or pipe 13 to hold it in any position to which it may be adjusted. The rod or pipe 13 may be connected to a similar rod or pipe 17 by means of the bolt 18 having the thumb screw 19. In order to form the joint, portions of the ends of the pipes 13 and 17 may be cut away, leaving ears through which the bolts 18 may extend. A sleeve 20 may be placed over the bolt 18 to form a means for clamping the parts together. Also a third pipe may be inserted in the pipe 17 and secured in its adjustable relation by means of the split ring 22. The lamp 23 may be connected to the pipe or tube 21 by means of the adjustable joint 24 which is constructed in the same manner that the joint between the pipes 13 and 17 is constructed.

By this arrangement the position of the lamp 23 may be readily adjusted. It may be swung to any position by reason of the fact that the members 2 and 1 are connected through pivot pins that are located at right angles to each other. Long adjustments, that is, adjustments that extend over considerable distance, may be readily made by the clamp 12 which may be moved to a desired position along the rod or pipe 9. The finer adjustments may be readily made by the pipes that interconnect the lamp 23 with the clamp 12.

I claim:

1. In a lamp bracket, a pair of telescoping members, one of the members having a plurality of slots closed at both ends and located near one end of the member and forming flexible portions between the slots, a split elastic ring surrounding the last named member and slidable along the member and the portions between the slots of the member and so constructed as to force the said portions of the member located between the slots against the other of the said telescoping members by the elasticity of the ring itself and pressing the said portions against the inner of the said telescoping members by the elasticity of the ring to yieldingly and adjustably secure the telescoping members relative to each other when the elastic ring is located over the central parts of the said portions between the slots and to relieve the said portions and disconnect the telescoping members from each other when the elastic ring is moved along the outer of the telescoping members to the ends of the slots, whereby the elastic ring is distended.

2. In a lamp bracket, a pair of telescoping members, one of the members having a plurality of slots closed at both ends and located near one end of the member and forming flexible portions between the slots, a split elastic ring surrounding the last named member and slidable along the member and the portions between the slots of the member and so constructed as to force the said portions of the member located between the slots against the other of the said telescoping members by the elasticity of the ring itself and pressing the said portions against the inner of the said telescoping members by the elasticity of the ring to yieldingly and adjustably secure the telescoping members relative to each other when the elastic ring is located over the central parts of the said portions between the slots and to relieve the said portions and disconnect the telescoping members from each other when the elastic ring is moved along the outer of the telescoping members to the ends of the slots, whereby the elastic ring is distended, the lower end of the outer telescoping member having an enlarged diameter formed by bellying the edge portion of the end of the outer of the telescoping members for receiving the elastic ring to maintain the ring in a distended position when the telescoping members are disconnected.

In testimony whereof, I have hereunto signed my name to this specification.

DAVID W. WILSON.